March 6, 1934.  A. DINA  1,949,457

FILM THREADING DEVICE FOR SPEAKING MOVIE MACHINES

Filed April 12, 1930   2 Sheets-Sheet 1

INVENTOR
Augusto Dina
BY
Howard W. Dix.
ATTORNEY

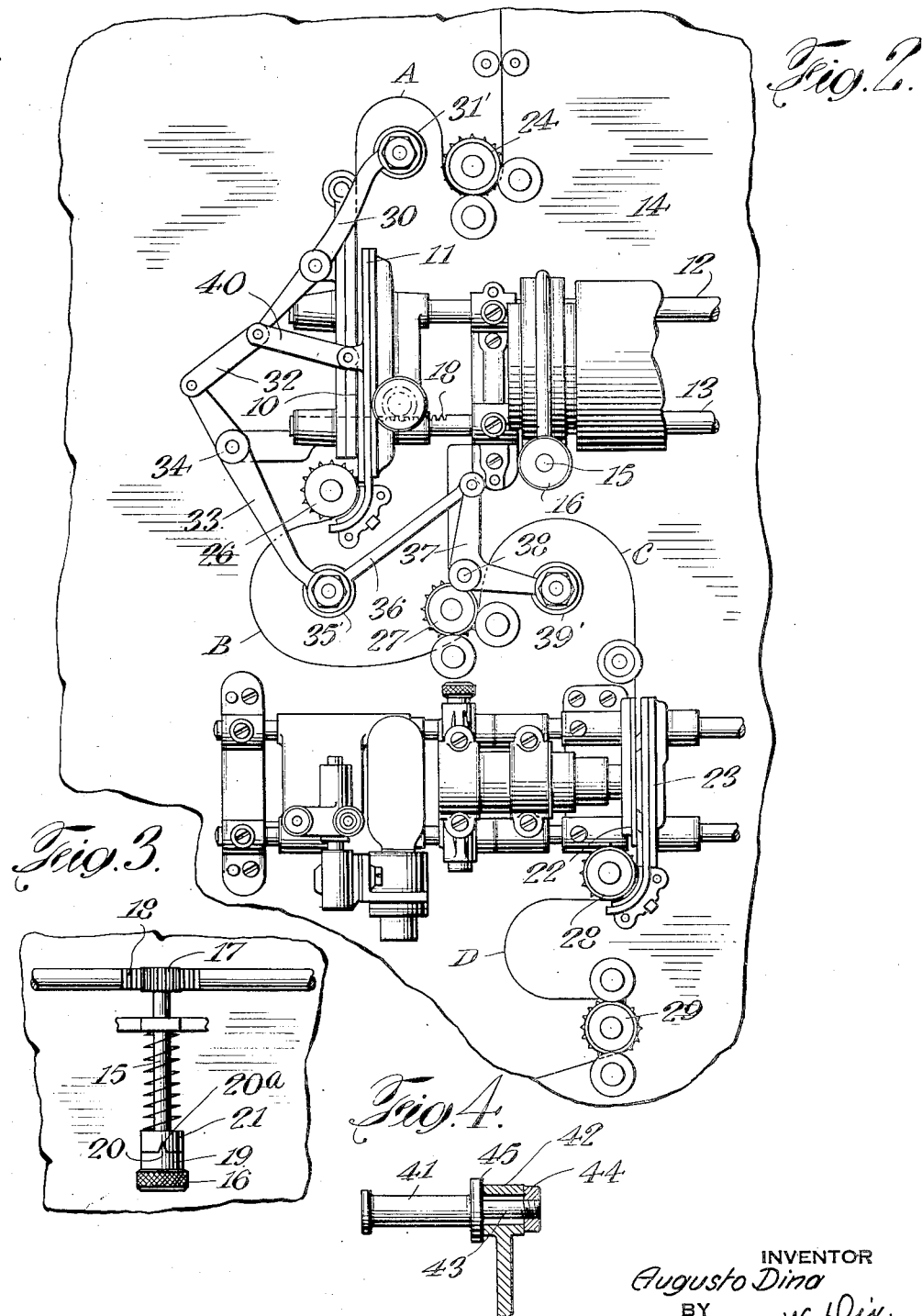

Patented Mar. 6, 1934

1,949,457

UNITED STATES PATENT OFFICE 1,949,457

FILM THREADING DEVICE FOR SPEAKING MOVIE MACHINES

Augusto Dina, Elizabeth, N. J., assignor to International Projector Corporation, New York, N. Y., a corporation of Delaware Application April 12, 1930, Serial No. 443,774

4 Claims. (Cl. 88—17)

This invention relates to new and useful improvements in speaking-movie apparatus and has especial reference to film threading apparatus for machines in which the production of sound is combined with the projection of pictures.

A main object of the invention is to provide a simple, compact, and efficient device whereby in threading the film in such machines there will be the proper and necessary synchronism and alinement between the part of the film bearing a picture section and that part of the film bearing the sound striata relating to that particular picture section. In order to properly project sound with pictures this synchronism is most desirable.

A further object is to provide a simple, efficient and easily operated means whereby the threading of a definite length of film between the light film trap and the sound film trap will be assured. Usually this definite length is measured from the center of the projection aperture to the center of the sound aperture.

Further and more specific objects, features and advantages will more clearly appear from the detailed description given below when taken in connection with the accompanying drawings which form part of the specification and which illustrate the present preferred form of the invention.

In a general contemplation of the invention and its preferred application, it is to be remembered that in movie tone film there is a definite distance between a given picture section and that part of the film which carries the corresponding sound striata. This distance is made necessary by the distance between the projection light aperture and the sound aperture in the speaking-movie projector. Because of this it is highly desirable that in threading the film, the operator be enabled readily to be certain that as a given picture section is framed in the projection light aperture, the corresponding sound portion of the film is framed in the projection sound aperture. This must also occur as a necessary and inevitable part of the threading operation so that as long as the operator threads the film properly the result will always be right.

In a preferred form of the invention, there is provided a suitable mechanism which moves when the film trap door is drawn back from the projection light gate so that the operator has a definite and determined length of path through which to thread the film to insure that this proper definite length of film is disposed between the two apertures. This same mechanism is such that when the door is moved against the gate and in position to grip the film for running, then the parts are in normal position and the film is free to operate and run as usual.

In the preferred form herein, there is provided a system of levers associated with the movable trap door so that when the door is drawn away from the gate the levers and certain elements, such as rollers thereon, will be positively disposed and locked in predetermined positions. When thus disposed the operator will thread the film over these rollers and thereby be certain that the path thus followed by the threaded film will give the required length of film disposed between the two apertures above mentioned. When the film is threaded, then the doors are moved to normal positions and the elements or rollers moved out of contact with the film thereby releasing the film which then assumes the normal running position in the machine. The doors and threading rollers are preferably locked in either their opened or closed position. The threading determining mechanism may not be movable with the door but may be operated independently thereof, if desired.

The present preferred form of the invention is shown in the drawings in which:

Fig. 2 is a similar view with the parts in their closed position;

Fig. 3 is a detail view of the mechanism for moving the door and locking it in either the open or the closed position; and Fig. 4 is a detail view of a roller or stub shaft over which the film travels as it is being threaded.

Figure 1:
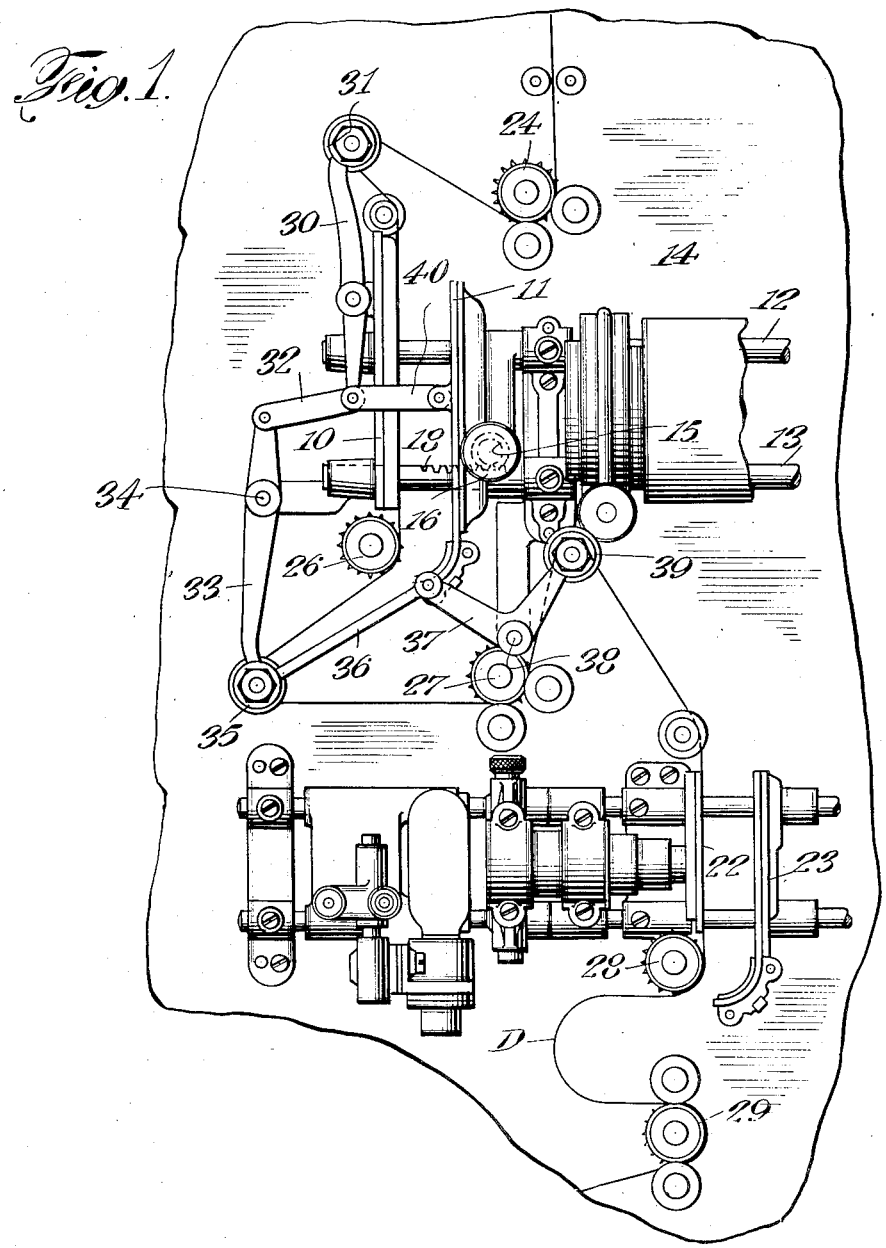
Fig. 1 is a side elevation of the machine embodying the invention with the parts in their open position.

As shown in the drawings, the present preferred form of the invention comprises a projection film trap mechanism including a gate 10 and a movable door 11. These members are preferably mounted on supporting rods such as 12 and 13, which are fastened to the central mechanism supporting partition 14 of a projection machine. The gate 10 and the door 11 may be adjusted in normal position along the rods 12 and 13 with respect to each other, and the door 11 for normal movement to and away from the gate is moved along the rods 12 and 13 by means of a shaft 15 having a knob 16 which is turned by the operator to turn a gear 17 on the end of the shaft 15, which gear meshes with a rack 18 on the rod 12, for instance. The shaft has a hub 19 provided with a tongue 20 normally engaging with a groove 20ª in the adjacent face of the hub 21 on the door 11 so that in predetermined positions the door will be locked or latched in either its opened or closed position. Thus it will be insured, that when the door is open or closed it will positively stay in these positions unless deliberately moved therefrom.

Below the trap for the film formed by gate 10 and door 11 and disposed on the partition 14, there is disposed another trap through which the film passes to transmit light through the striata at the edge of the film so that the sound may be produced and to be synchronized with the projection of the picture. This sound trap is formed by the sound gate 22 and door 23 which also may be moved away from and toward the gate 22 in any suitable manner and by any suitable means.

In the light projection film trap formed by gate 10 and door 11, there is an aperture with which the picture section must be framed. There is also an aperture for the sound striata in the trap formed between the gate 22 and the door 23. Now since a definite series of sound striata on the film will be in accord with a definite picture section series, it is obvious that these striata must be passing the aperture between gate 22 and door 23 at the same time that the corresponding picture section is passing through the trap between gate 10 and door 11. Thus the pictures and the sound will be in synchronism.

It is of course ideal to have the striata right alongside of the picture sections with which it is associated. The mechanism of the ordinary projector or moving picture machine will not permit this however, but there generally is a definite length of the film between the given picture section and its corresponding sound striata. This length is approximately 14½ inches. To be sure that the picture sections and the sound striata are thus synchronously alined with respect to their proper apertures, it is the essence of this invention to provide means whereby when the film is threaded, it is made to traverse a definite path or course the length of which between the two film traps is of the designated amount so that when the film threading is completed, the required length will be disposed between the two traps. The difficulty of leaving this matter to the discretion of the operator is that in forming the loops which occur throughout the length of the film, it will be practically impossible for the operator to judge the same length each time the film is threaded. To this end therefore there is provided a series of stops or elements such as rollers or pins over and around which the film is threaded so as to always pass over the same path which causes predetermined length of film to be measured off.

As viewed in Fig. 2, the film, as normally in the case, for operation travels from the upper magazine down around roller 24 to form loop A, then through the trap formed by the gate 10 and the door 11. Then it passes the intermittent sprocket 26 and forms the loop B with the lower feed sprocket 27, and then it forms the loop C and passes through the trap formed by the gate 22 and the door 23 which is the sound trap. After this it forms the loop D and then passes around the take-up sprocket 29.

It is obvious that in forming these several loops any operator is going to be unable to be sure that the same length of film is involved each time he threads the film through the machine. To enable him to be absolutely sure that the same length of film is involved, there is provided a suitable lever system described as follows: This system preferably comprises the lever 30 pivoted, preferably on the partition 14, although it may be mounted on the gate 10, and having a roller or pin 31 at one end. The other end of the lever 30 is connected to a link 32 which is connected to the upper end of another lever 33 which is pivoted at 34 on the partition 14 or gate 10. The lower end of the lever 33 has a roller or pin 35. To this end of the lever 33 there is connected a link 36 the other end of which is connected to one end of a lever 37 pivoted at 38 preferably on the partition 14. The opposite end of the lever 37 has a roller 39 or pin. The lower end of the lever 30 is connected by link 40 to the door 11, so that as the door 11 is moved the above mentioned lever system is actuated. This actuation is such that when the door 11 is closed the lever system assumes the position shown in Fig. 2, and when the door 11 is opened to its full open position then the lever system is in the position shown in Fig. 1.

In the position shown in Fig. 1 the pins or rollers 31, 35 and 39 are in such a position that if the film is threaded thereover then exactly the required length of film will be disposed between the aperture in gate 10 and the aperture in the gate 22 which is the desired threading. Then the operator has only to see that the right picture section is centered or framed in the aperture in the gate 10 and then thread the film properly over these rollers and the disposition of the rollers takes care of the rest without any thought or special attention on the part of the operator.

It is of course obvious that this particular lever system may be modified and can be otherwise operated than by the movement of the door 11. The main idea is to make sure that when the film is being threaded there is a definite and well defined path provided through which the film can be threaded to insure that the right length of it will pass or be disposed between the two apertures. It will be seen that when the door 11 is moved to the normal closed position that the lever system assumes the position shown in Fig. 2 and then the pins and rollers above mentioned will assume the positions shown by the numerals 31′, 35′ and 39′ in which positions they will permit the formation of the usual loops and will not in any way interfere therewith.

It may not of course be necessary to move the whole lever system in this manner. It would be possible to move just the pins or rollers to get them out of the way when the door is closed and the film operating in the usual manner. Also the means for moving the lever system, if it is to be moved, need not be connected to the door 11, it may be operated separately, and by hand, if desired.

Thus, there is provided a definite means providing a definite and certain length path through which the film may be threaded to insure that a definite length of film is disposed between the two apertures above mentioned. This means may be a system of levers which can be manipulated with or without the door of the projection film trap. It may also be in the form of means permanently disposed on the frame and provided with rollers or pins which receive the film and which themselves are movable.

The pins and rollers above mentioned are adjustably disposed on the levers or supports in such a manner as may be indicated in Fig. 4, in which 41 represents a roller or pin with an inner flange 45 bearing against the side of the journal 42. The reduced inner end 43 of the pin 41 is smaller than the bore in the journal so that it can be moved and adjusted therein. The outer end of the reduced end 43 receives a tightening nut 44 so as to clamp the roller or pin 41 in the adjusted position. This will permit the roller or pin 41 being adjusted to allow for slight variations in the length of the film and the position of the roller in the path thereof.

In the construction herein, it will be noted when the lever system is attached to the door and the door in its open position and so locked by the tongue 20 and groove 20ª, that the lever system is positively held in its expanded position so that the tight and desired threading may be readily accomplished without requiring special attention of the operator to hold the lever system solid. With this condition existing the desired length of film is obtained between the two apertures.

After the threading of the film, as above indicated, it has been found advantageous to close the sound door 23 thereby fixing the film between the gate 22 and the door 23 and around the sprocket 28. The door 11 may then be closed so that the film will be caught between the gate 10 and the door 11. It has been found desirable when moving the door 11 to have the operator place a finger of his left hand on the film at the top of the gate 11 thereby keeping the film tight between the teeth of the sprocket 26 and the top of the gate 10. Thus, when the door is closed, there is no change in the position of the film in front of the aperture in gate 10. In the event the roller threading means and its linked system is not associated with the door 11 by any means, then the door is closed while the film is still taut over the rollers 31 and 35 and remains properly positioned in front of the aperture in gate 10. In such an instance, after the closing of the door 11, then the rollers 31 and 35 and the linked system may be moved to thereby release the film to form the upper and lower loops and the loop above the sound gate.

It will therefore be noted that the invention herein pertains to any type of means over which the film may be threaded so that the definite length of film is obtained between the center of the projection aperture and the center of the sound aperture, and thereafter move the threading means so that the film will be released into proper position so that the machine may be started in operation. In addition, it will be noted that the threading parts or means may or may not be linked or associated with the door 11.

It will also be understood that the system and apparatus herein may be readily adapted for use in camera and film printing machines, if desired.

While the invention has been described in detail and with respect to the present preferred form thereof, it is not to be limited to such details and forms since many changes and modifications may be made and the invention embodied in other forms and modifications without departing from the spirit and scope of the invention in its broadest aspects. Hence, it is desired to cover any and all forms and modifications which may come within the language or scope of any one or more of the appended claims.

What I claim is:

1. In an apparatus for receiving film, a pair of film traps therein, film engaging elements disposed at opposite ends of one of said traps, a film engaging element disposed near the adjacent end of the other trap, movable levers supporting said film engaging elements, means connecting said supporting levers whereby the movement of one lever will effect the movement of the others, said levers adapted to be moved manually to a predetermined position whereby the film engaging elements are disposed in a predetermined relation with respect to the traps and each other so that a definite length of film can be threaded over said elements in this position, said levers adapted to be moved to another position whereby the film engaging elements are moved to a position out of engagement with the film during its normal travel through the apparatus.

2. In an apparatus for receiving a film, a pair of film traps having movable trap doors, film engaging elements adjacent opposite ends of one trap and a film engaging element near the adjacent end of the other trap, movable levers supporting said film engaging elements, means connecting said levers whereby the movement of one effects the movement of the others, means connecting one of said levers with one of said trap doors, said levers and film engaging elements adapted to be moved, when said door is moved to open position, to a definite position with relation to each other and the traps so that a predetermined length of film can be threaded over said film engaging elements, said film engaging elements and levers adapted to be moved to another position when said door is moved to a closed position whereby the film engaging elements are moved out of engagement with the film during its normal travel through the apparatus.

3. In an apparatus for receiving a film to project pictures and sound effects, a projection film trap, and a sound film trap, film engaging rollers disposed adjacent the opposite ends of the projection film trap, a film engaging roller disposed near the adjacent end of the sound trap, pivoted levers supporting said rollers, means connecting said pivoted levers whereby the movement of one will effect the movement of the others, said levers adapted to be manually moved to a predetermined position whereby the rollers are disposed in a predetermined relation to each other and the traps to permit a definite length of film to be threaded thereover, said levers adapted to be moved manually to another position whereby the rollers are disposed out of engagement with the film during its normal travel through the apparatus.

4. In an apparatus for receiving a film for projection and sound, a projection film trap and a sound film trap, movable doors associated with each trap, film engaging rollers disposed adjacent the opposite ends of the projection film trap, a film engaging roller disposed near the adjacent end of the sound trap, pivoted levers supporting said rollers, means connecting said levers whereby the movement of one will effect the movement of the others, means connecting one of said levers to a movable door of one of said traps, said levers and rollers adapted when said movable door is opened to be moved to a position wherein the rollers are disposed in such relation to each other and the traps as to permit a definite length of film to be threaded thereover, said levers and rollers adapted when said door is moved to a closed position to be disposed so that the rollers are out of engagement with the film during its normal travel through the apparatus.

AUGUSTO DINA.